United States Patent [19]

Hogenson

[11] Patent Number: 5,626,951
[45] Date of Patent: May 6, 1997

[54] THERMAL INSULATION SYSTEM AND METHOD OF FORMING THEREOF

[75] Inventor: Peter A. Hogenson, Long Beach, Calif.

[73] Assignee: Rockwell International Corporation, Seal Beach, Calif.

[21] Appl. No.: 416,125

[22] Filed: Apr. 3, 1995

[51] Int. Cl.⁶ .................................................. B32B 7/00
[52] U.S. Cl. ...................... 442/262; 428/902; 428/920
[58] Field of Search ........................... 428/229, 237, 428/252, 902, 920, 245, 260, 246

[56] References Cited

U.S. PATENT DOCUMENTS

| | | | |
|---|---|---|---|
| 3,395,035 | 7/1968 | Strauss | 117/72 |
| 4,148,962 | 4/1979 | Leiser et al. | 428/366 |
| 4,706,912 | 11/1987 | Perry | 244/158 |
| 4,713,275 | 12/1987 | Riccitiello et al. | 428/76 |
| 4,767,656 | 8/1988 | Chee et al. | 428/116 |
| 4,797,325 | 1/1989 | Verdin et al. | 428/473.5 |
| 4,833,030 | 5/1989 | Petersen | 428/408 |
| 4,877,689 | 10/1989 | Onstott | 428/607 |
| 4,925,134 | 5/1990 | Keller et al. | 244/158 |
| 4,983,451 | 1/1991 | Sugino et al. | 422/283 |
| 5,030,518 | 7/1991 | Keller | 428/550 |
| 5,038,693 | 8/1991 | Kourtides et al. | 112/440 |
| 5,071,700 | 12/1991 | Sugino et al. | 428/283 |
| 5,154,373 | 10/1992 | Scott | 244/117 |
| 5,236,151 | 8/1993 | Hagle et al. | 244/117 |
| 5,310,592 | 5/1994 | Baker et al. | 428/117 |
| 5,451,448 | 9/1995 | Sawko et al. | 428/175 |

FOREIGN PATENT DOCUMENTS

| | | |
|---|---|---|
| 3253497 | 2/1990 | Japan . |

OTHER PUBLICATIONS

D. Mui et al., "Development of a Protective Coating for Shuttle Orbiter Advanced Flexible Reusable Surface Insulation (AFRSI)", *Ceramic Eng. and Sci. Proc.*, vol. 6, No. 7–8, Jul.–Aug. 1985, pp. 793–805.

*Primary Examiner*—James J. Bell
*Attorney, Agent, or Firm*—George A. Montanye; Harry B. Field; Lawrence N. Ginsberg

[57] ABSTRACT

A thermal insulation system comprising an insulator core formed of ceramic material and, an outer layer integrally connected on an inner surface to a first side of the insulator core, the outer layer comprising a woven material impregnated with a ceramic matrix. In one embodiment, a thermal insulation blanket is formed having a flexible insulator core formed of ceramic fibrous materials, an outer layer integrally connected to one side of the insulator core, and an inner layer connected to a second side of that core. The inner layer is formed of woven material. In a second embodiment, a thermal insulation tile is formed including a rigid insulator core formed of ceramic material and an outer layer integrally connected to an inner surface to a first side of insulator core. The outer layer comprises a woven ceramic material impregnated with a ceramic matrix.

3 Claims, 2 Drawing Sheets

THERMAL INSULATION SYSTEM AND METHOD OF FORMING THEREOF

BACKGROUND OF THE INVENTION

1. Field of the Invention

This invention relates to a system for providing thermal insulation and, more particularly, to the use of a woven ceramic material impregnated with the ceramic matrix for providing enhanced durability.

2. Description of the Related Art

In the design of thermal protection systems for aerospace vehicles, such systems should not transfer excessive heat to the basic vehicle structure, should have low weight, and should produce low thermal stresses. Current thermal protection system concepts employ multitudes of ceramic tiles and flexible blankets as reusable surface insulation. For example, the U.S. Space Shuttle Program uses a thermal protection system, which includes a rigid ceramic insulation core with an unreinforced ceramic coating. Also, the Space Shuttle uses a flexible ceramic insulation core with a ceramic fabric exterior surface. Such tiles and blankets have the disadvantages of being subject to surface cracking and impact damage. In an effort to improve durability of the thermal protection system for the Space Shuttle Program, a toughened unipiece fibrous insulation, known as "TUFI" has been developed. TUFI comprises a ceramic solution with ceramic fillers, which are used to increase the density (hardness) of the exterior surface of the insulation core. However, Tufi is still subject to impact damage.

Another solution proposed and demonstrated by NASA is a ceramic matrix composite mechanically attached to a rigid insulator core. This thermal protection system is disclosed and claimed in U.S. Pat. No. 4,713,275, issued on Dec. 15, 1987. The attachment means include a self-locking wedge and complementary surface, ceramic pins, augers and the like.

Mechanical attachment has a primary disadvantage in that the ceramic core insulation has low resistance to fatigue loads.

Another thermal protection system used in the Space Shuttle Program is a flexible, thermal insulation blanket, which uses a flexible insulator core formed of ceramic materials sandwiched between two ceramic fabric layers and joined with ceramic thread. The sewing threads create a pillowing condition between the threads resulting in a non-uniform, unsmooth exterior surface. This causes undesired friction between adjacent fibers during flight and potential failure. Furthermore, the non-uniform, unsmooth exterior surface precludes the use of this material on the lower surface of the Space Shuttle because its use on this area would create unacceptable boundary layer conditions.

OBJECTS AND SUMMARY OF THE INVENTION

It is, therefore, a principal object of the present invention to provide a thermal protection system with enhanced durability.

It is another object to expand the area of the spacecraft in which a relatively low cost, flexible thermal protection system may be used.

In its broadest aspects, the present invention is a thermal insulation system comprising an insulator core formed of ceramic material and, an outer layer integrally connected on an inner surface to a first side of the insulator core, the outer layer comprising a woven material impregnated with a ceramic matrix. In one embodiment, a thermal insulation blanket is formed having a flexible insulator core formed of ceramic fibrous materials, an outer layer integrally connected to one side of the insulator core, and an inner layer connected to a second side of that core. The inner layer is formed of woven material. In a second embodiment, a thermal insulation tile is formed including a rigid insulator core formed of ceramic material and an outer layer integrally connected to an inner surface to a first side of insulator core. The outer layer comprises a woven ceramic material impregnated with a ceramic matrix.

The advantage of the thermal insulation tile includes the increased durability as a result of the outer layer of woven ceramic material impregnated with a ceramic matrix. Use of such a material improves the impact resistance. A major expense in the Space Shuttle operations is refurbishment between flights. One of the expense items is repairing damaged thermal protection system tiles. By the addition of woven ceramic material impregnated with the ceramic matrix to the exterior surface of these tiles, in accordance with the principles of the present invention, this expense item can be greatly reduced or eliminated.

The total cost of the space vehicle includes the thermal protection system, which is a significant percentage of the total cost, TPS tiles are one of the most expensive components of the system. One of the least expensive components are the flexible blankets. Therefore, if tiles can be replaced with blankets, the total system cost can be reduced. Thus, by increasing the capability of blankets so that such blankets can replace tiles, the goal of reduced, cost can be achieved.

Other objects, advantages and novel features of the present invention will become apparent from the following detailed description of the invention when considered in conjunction with the accompanying drawings.

BRIEF DESCRIPTION OF THE DRAWINGS

The same elements or parts throughout the figures are designated by the same reference characters.

DETAILED DESCRIPTION OF THE PREFERRED EMBODIMENT

Figure 1:
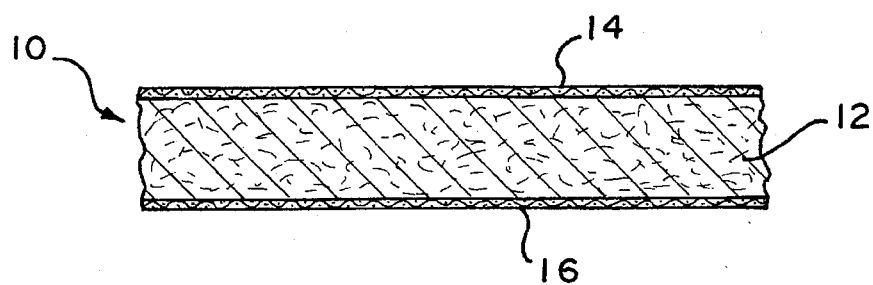
FIG. 1 is a cross-sectional view of a portion of a thermal insulation blanket fabricated in accordance with the principles of the present invention.

Referring to the drawings and the characters of reference marked thereon, FIG. 1 illustrates a first embodiment of the present invention in which the thermal protection system of the present invention is embodied as a thermal insulation blanket, designated generally as 10. Thermal insulation blanket 10 includes a flexible insulator core 12, an outer layer 14, and an inner layer 16. The flexible insulator core 12 is formed of ceramic fibrous materials. Such ceramic fibrous materials may include, for example, quartz fibers, alumina fibers, or combinations of ceramic fibers such as alumina, boria and silica. Such a combination of ceramic fibers is embodied, for example, in a product trademarked under the name "NEXTEL", manufactured by 3M Company. An alumina based ceramic fibrous material includes that manufactured by ICI, Inc. and marketed under the trademark "SAFFIL".

The outer layer 14 is integrally connected on an inner surface thereof to a first side of the insulator core 12. The outer layer 14 comprises a woven ceramic material impregnated with a ceramic matrix. The woven ceramic material may also be comprised of quartz fibers, NEXTEL™ fibers or other ceramic fibers.

The ceramic matrix may be, for example, silicon carbide, silicon nitride, or other suitable ceramic material that does not chemically react with the woven ceramic material.

The inner layer 16 is connected to a second side of the insulator core 12. The inner layer 16 is comprised of a woven material such as, for example, S Glass, E Glass or other fiberglass fabrics, such as material manufactured by Owens-Corning Fiberglass Company.

Figure 2:
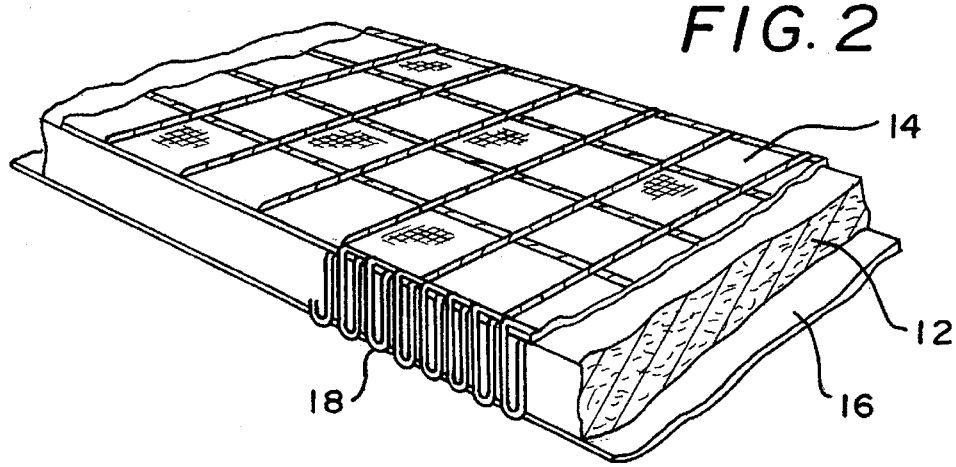
FIG. 2 is a detailed cross-sectional view of a portion of a thermal insulation blanket, which shows the outer and inner layers being attached by sewing.

The thermal insulation blanket 10 may be prepared by the following techniques. Referring now to FIG. 2, in a first technique, an insulator core 12 is provided, which is formed of ceramic material. The outer layer 14 and the inner layer 16 are joined to opposite sides of the insulator core by sewing the same together with a ceramic thread 18. The outer layer 14 is then impregnated with the ceramic matrix, thereby providing a smooth, uniform surface. This step of impregnation may comprise chemical vapor infiltration or chemical vapor deposition.

Figure 3:
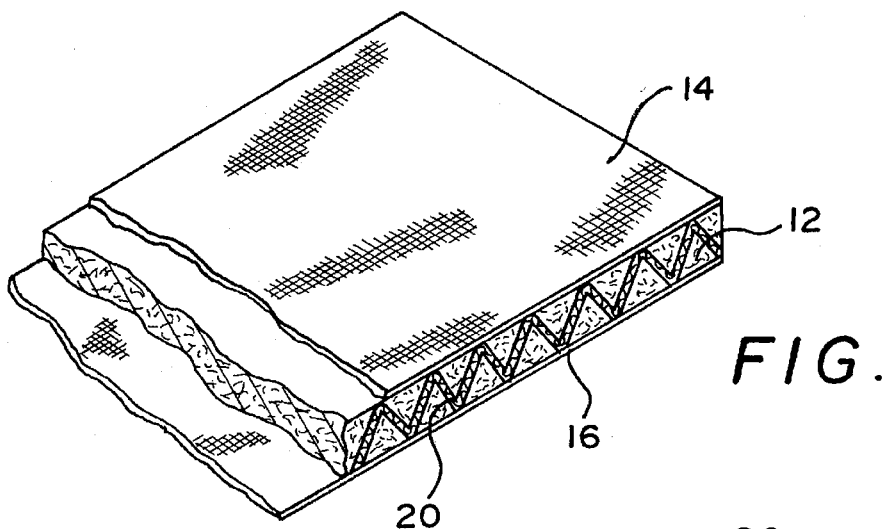
FIG. 3 is a detailed cross-sectional view of a thermal insulation blanket, which shows the outer and inner layers being attached by integrally weaving.

Referring now to FIG. 3, a weaving machine is used to produce the fabric component of a thermal insulation blanket. This fabric component comprises the inner layer 16, outer layer 14 and a connecting web 20. The core 12 is inserted in the interstitial space between the inner layer 16 and outer layer 14. As in the previous embodiment, the outer layer is then impregnated with a ceramic matrix by chemical vapor infiltration or chemical vapor deposition.

Figure 4:
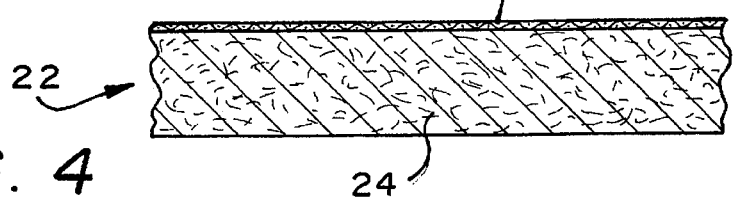
FIG. 4 is a cross-sectional view of a portion of a thermal insulation tile fabricated in accordance with the principles of the present invention.

Referring now to FIG. 4, a thermal insulation tile is illustrated, in accordance with the principles of the present invention, designated generally as 22. Thermal insulation tile 22 includes a rigid insulator core 24 formed of ceramic material. An outer layer 26 is integrally connected on an inner surface to a first side of the insulator core. The outer layer comprises a woven ceramic material impregnated with a ceramic matrix. The rigid insulator core 24 is formed of ceramic fibers, which have been sintered to form a rigid ceramic low density block. This block is machined to the required dimensions. A layer of woven ceramic fabric 26 is applied to a first side of the insulator core 24. It is understood that although the outer layer 26 has been shown to be along only one side, for the purposes of simplicity, it may extend along one or more of the four adjacent surfaces. The woven material used to form the outer layer 26 may comprise a woven ceramic material or a woven carbon fiber material. The outer layer 26 is impregnated with a ceramic matrix using chemical vapor infiltration, chemical deposition or liquid impregnation. This results in an integrally attached outer layer 26 to core 24.

Figure 5:
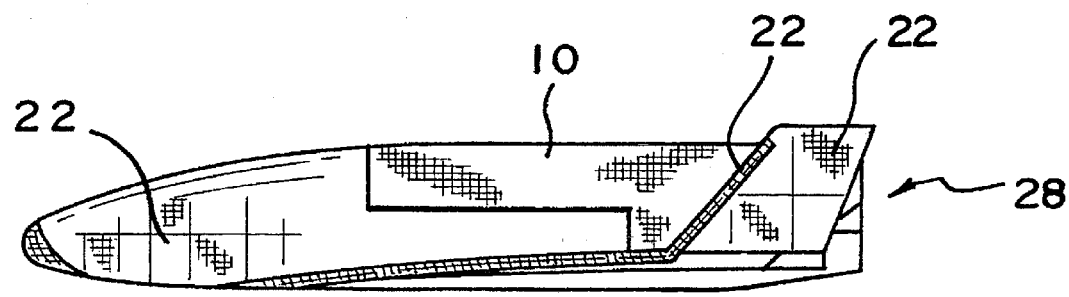
FIG. 5 is a side perspective schematic illustration of a space vehicle utilizing the thermal protection system of the present invention.
Figure 6:
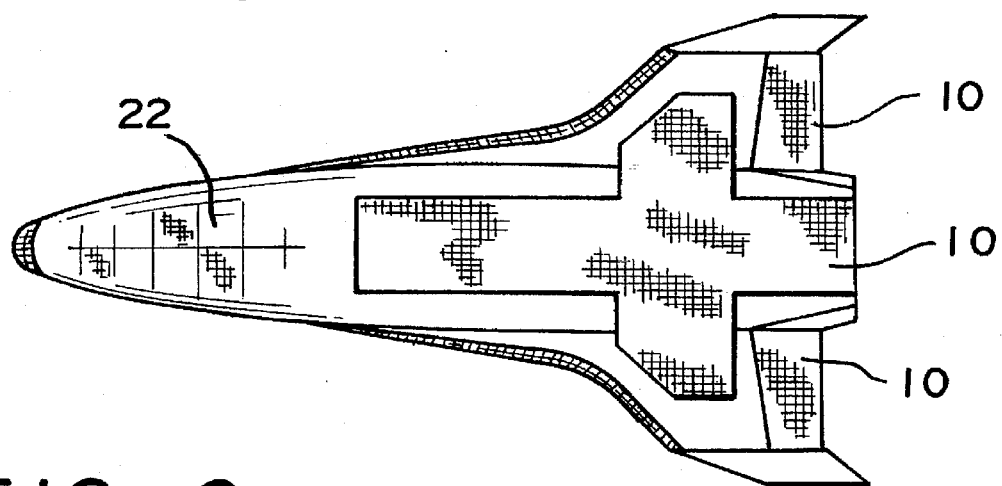
FIG. 6 is a top view of the space vehicle of FIG. 5.
Figure 7:
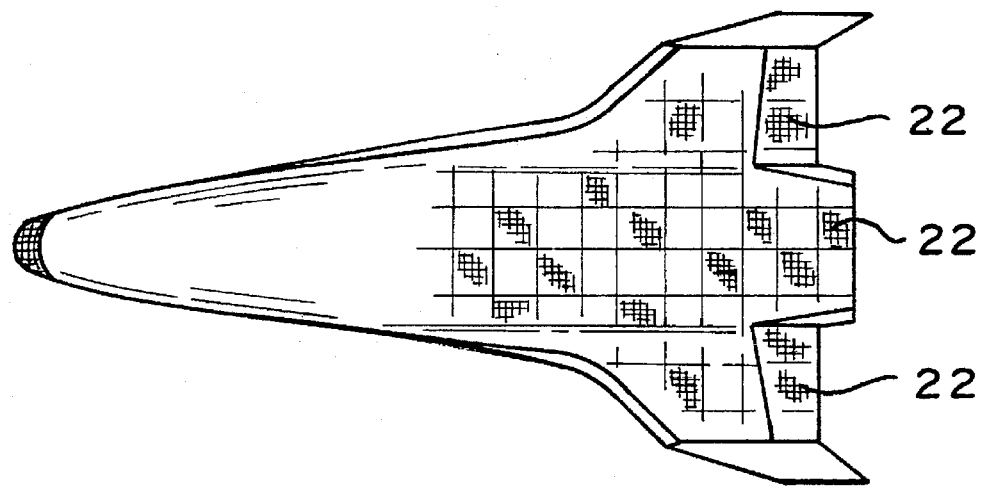
FIG. 7 is a bottom view of the space vehicle of FIG. 5.

Referring now to FIGS. 5–7, it may be seen how the thermal protection blanket 10 and tiles 22 of the present invention may be utilized with the space vehicle, designated generally as 28. As can be seen by these figures, the blanket material 10 is most typically used on the upper surface of the vehicle, while tile material 22 is most typically used on the lower surfaces.

Obviously, many modifications and variations of the present invention are possible in light of the above teachings. It is therefore to be understood that, within the scope of the appended claims, the invention may be practiced otherwise than as specifically described.

What is claimed and desired to be secured by Letters Patent of the United States is:

1. A thermal insulation blanket, comprising:

a flexible insulator core formed of ceramic fibrous materials;

an outer layer integrally connected on an inner surface to a first side of said insulator core, said outer layer comprising a woven ceramic material impregnated with a ceramic matrix, said woven ceramic being impregnated by infiltration or deposition; and an tuner layer connected to a second side of said insulator core, said inner layer comprising a woven material.

2. A thermal insulation tile, comprising:

a rigid insulator core formed of ceramic material, said core being sized so as to be capable of being installed at a desired location on the surface of an aerospace vehicle; and, an outer layer chemically and integrally connected on an inner surface to a first side of said insulator core, said outer layer comprising a woven material impregnated with a ceramic matrix, said woven material being impregnated by infiltration or depositon, said insulator core and outer layer forming a unified structure which can be installed at said desired location.

3. The thermal insulation system of claim 1, wherein an outer surface of said outer layer is substantially smooth.

* * * * *